United States Patent Office 3,780,183
Patented Dec. 18, 1973

3,780,183
PLANT PROTEIN PRODUCT AND PROCESS
George Wheeler Edwards and Arrie Wood Edwards, both of Rte. 4, Kay Drive, Jackson, Tenn. 38301
No Drawing. Filed Jan. 25, 1971, Ser. No. 109,714
Int. Cl. A23k 1/00
U.S. Cl. 426—50
15 Claims

ABSTRACT OF THE DISCLOSURE

Alfalfa and clover, containing natural protein, is treated with an aqueous basic solution, the resulting extract is digested at a pH of about 6 to 14 with pancreatin and the undissolved material is separated from the aqueous digested extract to form an edible product.

---

This invention relates to foods for humans and lower animals. More particularly, this invention is concerned with a food product obtained from plants which are not generally considered directly consumable by humans, and to a process of producing such a product.

Alfalfa and clover contain crude protein and are used commonly as food for ruminants and other animals. While they contain protein in amounts useful for human feed, such plants have been used only sparingly for human food. There are reasons for this. One is that the plants taste bad. Another is that many of them are indigestible. The production of acceptable human food from such plants, however, continues to be investigated because of the present and future needs for new food supplies. It has been recognized that humans cannot forever rely on meat as their primary protein source. The production of protein by animal husbandry is slow, expensive and inefficient, and in the case of large animals requires much land and feed. The continued increases in the human population make it abundantly clear that humans must seek protein foods from plants.

There is accordingly provided by the subject invention a novel human food product high in protein as well as carbohydrates, vitamins, minerals and essential amino acids, produced from plant raw materials, and a process of producing such a product. The product, in addition, can be used as food for lower animals. By-products of the process are also obtained which constitute excellent animal food.

In producing the product of this invention alfalfa or clover is first brought into contact with an aqueous solution of a base which will not leave a residue which may adversely affect the suitability of the product or leave it unpalatable. The aqueous basic solution digests the plant material and this yields an aqueous extract. The aqueous extract, with or without a prior separation of undissolved material, is then treated at least with pancreatin to convert starches into soluble carbohydrates, digest lipids and release protein hydrolysates. The resulting aqueous solution, advisably after separation of lipids and lipoproteins, can be added to other foods without prior concentration, or it can be concentrated by removal of water before being so used.

In practicing the first main step of the process, alfalfa or clover containing a significant amount of naturally occuring protein can be used. The materials presently considered most suitable are cut alfalfa and dehydrated alfalfa with dehydrated alfalfa being the starting material of choice.

While a considerable number of basic materials can be used for the extraction, it is advisable to employ an alkali metal hydroxide or carbonate, or an alkaline earth hydroxide or carbonate, or any combination of these bases in aqueous solution. Sodium hydroxide, sodium carbonate, potassium hydroxide, potassium carbonate, magnesium hydroxide, magnesium carbonate and calcium hydroxide and mixtures thereof are specific bases which can be used in aqueous solution. Sodium hydroxide, because of its low cost, effectiveness, suitability for use in food processing and ready availability, is advisably employed.

The concentration of the aqueous basic solution used in digesting the plant material is not narrowly critical. However, it should advisably have at least a pH of 8 or higher. While solutions containing higher quantities of a base can be used, there is no advantage, and sometimes disadvantages, in using an aqueous solution containing more than 10% by weight of a base. In the case of sodium hydroxide, a solution containing higher than 7.5% by weight of this base is generally unnecessary. It is presently considered that an aqueous basic solution having a pH of about 8 to 14 gives the best results. Particularly useful is a 0.33% by weight solution of sodium hydroxide in water having a pH of 10.5.

The ratio of the amount of plant material by weight to the volume of the aqueous basic solution used for the extraction is not narrowly critical. However, from about 1 to 5 liters of aqueous basic solution can be suitably employed to extract one pound (454 g.) of plant material. It is considered advisable for optimum processing to use sufficient basic solution so that the pH of the resulting extraction slurry does not drop significantly below pH 8 as a result of the formation of acidic substances by the extraction.

The extraction can be readily effected by forming a slurry of the plant material in the aqueous basic solution. The extraction is advisably effected at an elevated temperature up to the boiling temperature of the solution. The aqueous basic solution can be pre-heated before it is combined with the plant material or a slurry of the plant material in the aqueous basic solution can be first formed and the slurry then heated. Stirring of the slurry during the extraction is advisable. The extraction is considered completed after about 30 minutes to 2 hours, depending on the temperature of the extraction. When the slurry is boiled, an extraction time of 30 minutes to 1 hour is generally suitable.

After the digestion or extraction with the basic solution is terminated, the slurry is brought to a temperature of about 38° C. to 75° C., without separating the liquid phase from the dispersed solids but with adjustment of the slurry to about pH 6 to 14 if necessary, and pancreatin is added thereto. When a strong basic solution is used for the digestion, the resulting extract will be more basic than suitable for pancreatin stability and effectiveness. An acid may accordingly be added to lower the extract pH to a level which favors pancreatic activity. Generally, enough acid may be added to bring the pH of the extract to about 6 to 14. Any suitable acid may be used for this purpose but phosphoric acid is advisably employed since it exerts a buffering action. Hydrochloric acid and sulfuric acid are some other mineral acids which can be used. Organic acids that may be used are citric acid, acetic acid and succinic acid.

The most suitable temperature range for effecting the pancreatin treatment appears to be about 40° C. to 50° C. The amount of pancreatin added is not narrowly critical but a sufficient amount should be added to convert the proteoses and starches to soluble carbohydrates, proteins and amino acids. In general, about 0.2 g. to 5 g. of pancreatin can be added per pound of plant material used as starting material. The most suitable range, however, appears presently to be about 0.5 g. to 1 g. of pancreatin per pound of plant starting material, particularly when alfalfa is the starting material. The inclusion of about 0.5 g. to 1 g. of corn and potato starch amylase per pound of starting material, with the pancreatin, is beneficial and aids in reducing bitterness in the final product.

The slurry incubation with pancreatin is continued for sufficient time to effect the desired conversion. Usually from about 12 to 48 hours is sufficient although a longer period does no appreciable harm. After digestion with pancreatin for 24 hours, the slurry can be expected to have an odor somewhat like grapefruit juice. As a result of the pancreatin treatment, the slurry pH may drop to about 5 to 6.

Following the pancreatin incubation, the slurry is separated into a solid phase and a liquid phase by any suitable means, such as filtration, centrifugation or decantation. When the product is filtered, the filtered extract may develop a greenish black substance comprising decomposed chlorophyll and lipids which settles out. This substance can be removed by centrifugation or gravity settling. The liquid extract constitutes a human and animal food product rich in digestible protein, carbohydrates, essential amino acids, vitamins and minerals. The liquid extract, containing about 4 to 5% solids, can be added to other foods. It can be concentrated, however, by a number of means to raise the solids concentration up to about 50 to 100%. One method of concentration is to heat the liquid extract to boiling to evaporate water. However, the pH of the liquid extract advisably is adjusted to a pH of about 4 to 5 by the addition of a mineral acid before the evaporation. Phosphoric acid and hydrochloric acid or some other acid can be used for this pH adjustment. Thin channel ultrafiltration can also be used to concentrate the liquid extract. At a concentration of about 40% solids the product can still be poured and pumped easily. More concentrated solutions become viscous and are more difficult to handle. However, liquid extracts of this invention can be spray dried onto a solid particulate carrier using conventional techniques to produce a free flowing solid edible composition. When dried at 100° C. it forms a hydrogel.

The invention also provides important variations and supplementary procedures which can be employed in conjunction with the key steps of the process already described and which lead to even more useful products.

One important supplementary procedure is to inoculate the slurry, obtained from the aqueous basic solution extraction, with a suitable yeast simultaneously or contemporaneously with the addition of the pancreatin. The conditions employed for the pancreatin treatment can be selected to be highly conducive to yeast growth in the slurry and the growth of yeast induces a highly beneficial conversion of products in the slurry into materials advantageously present in a human food. The growth of yeast, in itself, provides a protein supplementation which is desirable in the product. Any suitable yeast can be employed but for simplicity, common baker's yeast (*Saccharomyces cerevisiac*) is advisably used. *Torula utilis* is another suitable yeast. About 1 g. to 2 g. of yeast per pound of plant starting material is adequate although more or less yeast than this can be used. Adding yeast with the pancreatin tends to increase the protein content and to decrease the ash content, the latter of which is often desirable, of the product. When yeast is used, the product can be worked up in the same way as described for the use of pancreatin without yeast, using an incubation period of about 12 to 48 hours.

A second significant supplementary procedure which can be used constitutes a treatment of the slurry obtained from the pancreatin digestion, and advisably before separation of undissolved solids therefrom, whether or not yeast has been used in conjunction with the pancreatin, with another enzyme or mixture of enzymes. Potato-corn starch amylase, pepsin, trypsin, papain, hog pancreas diastase, malt diastase, steapsin, cellulase and pectinase are specific enzymes which can be used. However, any enzyme which acts on protein, lipid or carbohydrate can be used. Potato-corn starch amylase is presently considered the best choice. The use of one or both of these enzymes in the process leads to an even more suitable product. The amount of enzyme added is not narrowly critical. Usually about 0.1 g. to 1 g. of enzyme per pound of plant starting material is suitable although more or less than this can be used. During such treatment, which can continue for about 12 to 48 hours, the slurry is advisably maintained at a temperature of about 38° C. to 75° C. with 45° C. considered optimum. In addition, the extract is advisably adjusted, if necessary, to pH 8 to 10 to obtain maximum enzyme effectiveness. Treatment with the enzyme as described can be expected to bring the slurry pH down from about 7 to about 5 especially if no buffer such as phosphoric acid is present. When such a supplementary procedure is used, the resulting slurry can be worked up as already described. It thus can be filtered to separate undissolved solids and then the liquid extract can be concentrated if desired.

For human use, the liquid extract is desirably further treated to remove chlorophyll and lipoproteins. These materials can be removed by aging to allow lipoprotein to settle followed by filtering the liquid extract through cotton. The lipids can be removed from the cotton by washing the cotton with acetone or some other organic solvent in which lipids or fats are soluble.

The resulting product generally has about 4 to 5% solids and is a light brown liquid and is stable without refrigeration. For human use, it is advisable to adjust the pH of the extract with an acid to about 4 to 5 depending on the food to which it is to be added. A mineral acid or organic acid is advisably used for this purpose, and advisably one which is acceptable in foods. Acetic acid, hydrochloric acid, phosphoric acid, sulfuric acid, succinic acid and citric acid are some acids which can be used for this purpose. The product can be concentrated by boiling off water until any suitable concentration of solids is obtained. When the solids concentration reaches about 40–50%, the product becomes quite viscous and as the solids concentration increases it becomes thicker and flows slower. The solid content can be increased up to a hydrogel very similar in texture to cooked raisins or dried fruit. It does not form a crystal or free flowing solid but it can be absorbed onto a carrier for the production of a granular product.

The product of this invention constitutes a food which can be absorbed into the blood stream with little digestion. It is low in lipids.

The product can be added to fruit and vegetable juices, starch products such as bread, rolls and cakes, blancmange, chocolate foods of all types, ice cream, ice milk, ground and comminuted meats such as hamburger meat and sausage meat, other plant protein foods, soups, cookies and candy using products which have an appropriate solids content for use in the foodstuff.

The product can function as a wetting agent for less soluble protein foods and as a water retaining material in foods. It also constitutes a complete growth medium for *Lactobacillus arabinosus, L. fermenti, L. Casei* and other bacteria. It can be used as a caragheen extender in foods such as ice milk, ice cream and candy. It is also a good acid buffer.

The product, in addition to its protein and carbohydrate content, contains A and B vitamins.

The residue obtained from the process after filtration of the enzyme treated slurry can be dried and used in all types of animal feed. It can also be used in brewing tea in which it can be used in admixture with tea leaves. The residue can also be retreated as described with an aqueous basic solution to form an extract and the extract can be digested with pancreatin to form a liquid extract which can be used as an animal feed. The lipoprotein fraction separated in the process can also be used in animal feed.

EXAMPLE 1

113 grams (0.25 lb.) of alfalfa meal is added to 850 ml. of an aqueous 0.33% sodium hydroxide solution. The mixture is boiled for one hour. The solution is cooled to 45-50° C. and then 0.125 g. of pancreatin and 0.25 g. of baker's yeast are added. The mixture is incubated for 48 hours. The greenish black lipoprotein was separated by decantation and the liquid extract containing 5% solids was evaporated to a product containing 50% solids. The extract contained 28% of the 113 g. of starting alfalfa meal. The extract solids analyzed: crude protein, 19.20%; fat, 0.231%; crude fiber, 0.037%; nitrogen free extract carbohydrates, 80% and ash, 0.37%.

EXAMPLE 2

100 grams of alfalfa meal is added to 400 ml. of a 7.5% aqueous solution of sodium hydroxide and the mixture is boiled for one hour. The mixture is diluted to 750 ml. with water and 85% phosphoric acid is added to pH 8-10. The procedure of Example 1 is then followed. The resulting aqueous extract constitutes 60%, and the residue 40%, of the starting alfalfa meal.

EXAMPLE 3

One pound of alfalfa meal containing 17.5-22% protein and 7-15% water is mixed with 3 liters of 0.3% sodium hydroxide and heated at a low boil for one to two hours. The mixture is cooled to 45-50° C. and incubated for 12-48 hours with 0.5-1.0 g. of pancreatin. The enzymatic reaction is very active after 24 hours and carbon dioxide is liberated. The pH drops to 5-6. The extract is separated from the residue and allowed to age for 24-48 hours in a suitable container—polyethylene plastic bottle is suitable. A greenish black lipoprotein layer settles to the bottom. The brown supernatant is decanted from the top through a loose plug of cotton to remove any remaining suspended green or black particles. The pH is lowered to 4 with phosphoric acid. The extract (5% solids) is heated to remove water and increase the solid content. The solid content can be increased up to a level which yields a hydrogel very similar to cooked raisins or dried fruit.

EXAMPLE 4

One pound of alfalfa meal (17.5 to 22% by weight protein and 7 to 15% by weight water) is added to 3 liters of a 0.33% aqueous sodium hydroxide solution. The resulting slurry is mixed and boiled for 1 hour with stirring during which the slurry pH drops from 10.5 or above to about 8. The slurry is cooled to 45° C. and inoculated with 1 g. of pancreatin and 2 g. of baker's yeast and incubated at 45° C. for 24 hours. The slurry pH is about 5-7 after the incubation. The slurry is then filtered through a strong cotton cloth. The aqueous filtrate has a pH of about 6 and contains about 5% solids. The solid residue on the filter is removed, dried and saved for use as animal feed. The extract, after aging for 24 hours, is dripped through a cotton plug to remove chlorophyll and lipids. The filtrate (5% solids) is acidified to pH 4-5 with phosphoric acid and boiled until the solution contains about 10% solids by weight. The product can be further concentrated to 50-100% solids.

EXAMPLE 5

One pound of the residue from Example 4 is treated with 1.5 liters of 10% sodium hydroxide for 2 hours at the boiling point. The solution is diluted to 9 liters and pH adjusted to 8-9 with hydrochloric acid. Incubation is carried out with 0.5 g. of pancreatin and 0.5 g. of potato-corn starch amylase for 48 hours. An aqueous suspension of 5% solids is formed. Any large particles which are present after digestion and do not suspend can be treated by repeating the digestion process or by treating with a fast speed blender. The material is dark green in color and is used as an animal feed. It can be dried to a green solid if desired. It can be pumped and mixed with other feed and is a feed for swine and other animals.

EXAMPLE 6

Alfalfa Sloppy Joes 3 tablespoons vegetable oil
2½ pounds ground beef
2 onions, chopped
1 green pepper, chopped
2 cans (10.5 oz.) tomato soup, undiluted
1 cup catsup
¾ cup alfalfa extract (10% solids-Example 1)
½ cup flour
2 teaspoons Worchestershire sauce
Salt and pepper to taste
Hamburger buns Brown the ground beef in vegetable oil; add onion and green pepper and cook about five more minutes. Stir in flour, soup, catsup, alfalfa extract and Worchestersire sauce and cook until thickened. Season with salt and pepper and serve on hamburger buns.

EXAMPLE 7

Alfalfa Spiced Tea

¼ cup alfalfa residue from Example 4
⅛ cup loose tea
½ teaspoon ground cloves
½ teaspoon ground cinnamon
½ cup sugar
¼ cup orange juice
6 cups boiling water To 6 cups boiling water add ½ cup sugar and stir until sugar dissolves. Tie alfalfa residue, tea and spices in a bag, loosely. Drop bag in sugar water solution and allow to simmer at least 10 minutes. Add ¼ cup orange juice. Serve hot. May be reheated as desired.

EXAMPLE 8

Chocolate Blancmange 2 envelopes plain gelatin
3½ cups milk
2 one-ounce squares unsweetened chocolate
1 cup sugar
2 tablespoons alfalfa extract (10% solids, Example 4)
1 teaspoon vanilla Soften the gelatin in ½ cup milk. Heat remaining milk. Add chocolate, sugar, alfalfa extract and vanilla and stir until the sugar is dissolved. Pour over gelatin and stir until dissolved. Chill until set. The taste is not changed by the alfalfa, but the texture is greatly improved, creamier.

EXAMPLE 9

Butterscotch Drops

½ cup sugar
¼ cup light corn syrup
¼ cup alfalfa extract (10% solids, Example 4)
1 tablespoon butter
½ teaspoon vanilla
Dash butter rum flavoring Combine sugar, corn syrup and extract; bring to boil; cook over low heat; stir until sugar is dissolved. Cook without stirring to hard-ball stage. Add butter; cook to soft-crack stage. Remove from heat and add butter rum flavoring and vanilla. Drop from teaspoon to greased baking sheet. No change in taste due to the alfalfa extract.

EXAMPLE 10

3 or 4 tablespoons of alfalfa extract (5-10% solids) may be substituted for that much water in making a can of soup. No change in taste.

EXAMPLE 11

¼ cup alfalfa extract (5-40% solids) may be blended into one roll of refrigerated cookie dough or added to any cookie recipe. Cookies with the extract stay fresh longer.

EXAMPLE 12

10 grams of alfalfa was added to 150 ml. of 0.166% sodium hydroxide and the mixture boiled for 10 minutes. After boiling, the pH of the mixture was 8 to 9. To the mixture at 40° C. was then added 0.01 g. of pancreatin and 0.01 g. of pepsin. The mixture was then incubated for 3 hours. The pH of the mixture was 8, and the amount of the extract was 2.7 g., after 3 hours. At the end of 21 hours of incubation, the pH was 7 and the amount of the extract was approximately 3.6 g. The residue was about 6.5 g. The extract was then further processed as in Example 1.

What is claimed is:

1. The process which comprises treating a plant substance of the group consisting of alfalfa and clover, containing natural protein, with an aqueous basic solution, digesting the resulting slurry at a pH of about 6 to 14 with pancreatin, and separating the dissolved and undissolved materials from the aqueous digested slurry, both said dissolved and undissolved materials being useful as food substances.

2. The process of claim 1 in which the aqueous basic solution contains an alkali metal hydroxide or carbonate or an alkaline earth metal hydroxide or carbonate.

3. The process of claim 1 in which the plant substance is dehydrated alfalfa.

4. The process of claim 1 in which the pancreatin digestion is expected at about 38° C. to 75° C.

5. The process of claim 1 in which a yeast, suitable for food, is included during the pancreatin digestion.

6. The process of claim 1 in which an enzyme, in addition to pancreatin, which acts on protein, lipid or carbohydrate is included with the pancreatin.

7. The process of claim 6 in which the enzyme is potato-corn starch amalyse, pepsin, trypsin, papain, hog pancreas diastase, malt diastase, steapin, cellulase or pectinase.

8. The process of claim 2 in which the aqueous basic solution used has a pH of at least 8.

9. The process of claim 1 in which the concentration of the aqueous basic solution gives a pH not less than 8 and the solution contains up to 10% by weight of basic material.

10. The process which comprises treating alfalfa with an aqueous basic solution having a pH not less than 8 and containing up to 10% by weight of basic material at an elevated temperature up to the boiling temperature of the solution, adjusting the pH of the slurry to about 8 to 10 when necessary, adding pancreatin to the slurry at about 38° C. to 75° C., separating solids from the liquids of the slurry after the pancreatin digestion is terminated, both said solids and liquids being useful as food substances.

11. The process of claim 10 in which the basic material is sodium hydroxide.

12. The process of claim 10 in which the pancreatin digestion continues for about 12 to 48 hours.

13. The process of claim 10 in which the slurry from the pancreatin digestion is evaporated to increase the solids content to at least 30%.

14. The process of claim 10 in which yeast, potato-corn starch amylase, pepsin, trypsin, papain, hog pancreas diastase, malt diastase, steapin, cellulase or pectinase is included with the pancreatin digestion.

15. A plant extract aqueous solution produced according to the process of claim 1.

References Cited

UNITED STATES PATENTS

| 3,220,851 | 11/1965 | Rambaud | 99—17 |
| 3,018,280 | 1/1962 | Salzberg | 99—17 |
| 2,051,017 | 8/1936 | Schwarz | 99—17 |
| 3,258,407 | 6/1966 | Blanchon | 99—17 |
| 3,516,349 | 6/1970 | Bertullo et al. | 99—17 |
| 2,930,700 | 3/1960 | Bradof | 99—99 |
| 3,637,396 | 6/1971 | Hollo et al. | 99—9 |

A. LOUIS MONACELL, Primary Examiner

R. M. ELLIOTT, Assistant Examiner

U.S. Cl. X.R.

426—53, 212

UNITED STATES PATENT OFFICE
CERTIFICATE OF CORRECTION

Patent No. 3,780,183     Dated December 18, 1973

Inventor(s) George Wheeler Edwards et al.

It is certified that error appears in the above-identified patent and that said Letters Patent are hereby corrected as shown below:

Column 7, Line 30, change "expected" to --effected--.

Signed and sealed this 16th day of July 1974.

(SEAL)
Attest:

McCOY M. GIBSON, JR.
Attesting Officer

C. MARSHALL DANN
Commissioner of Patents